United States Patent
Marinier et al.

(10) Patent No.: US 12,156,220 B1
(45) Date of Patent: Nov. 26, 2024

(54) METHODS, ARCHITECTURES, APPARATUSES AND SYSTEMS FOR NETWORK ENERGY SAVINGS

(71) Applicant: InterDigital Patent Holdings, Inc., Wilmington, DE (US)

(72) Inventors: Paul Marinier, Brossard (CA); Faris Alfarhan, Montreal (CA); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/775,919

(22) Filed: Jul. 17, 2024

Related U.S. Application Data

(63) Continuation of application No. 18/706,190, filed as application No. PCT/US2022/048779 on Nov. 3, 2022.
(Continued)

(51) Int. Cl.
*H04W 72/21* (2023.01)
*H04W 72/1268* (2023.01)
(Continued)

(52) U.S. Cl.
CPC ....... *H04W 72/21* (2023.01); *H04W 72/1268* (2013.01); *H04W 72/231* (2023.01); *H04W 72/232* (2023.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543;
(Continued)

(56) References Cited

U.S. PATENT DOCUMENTS

| | | | |
|---|---|---|---|
| 2017/0280498 A1 | 9/2017 | Min et al. | |
| 2022/0131677 A1* | 4/2022 | Lin | H04L 5/0091 |

(Continued)

FOREIGN PATENT DOCUMENTS

| | | |
|---|---|---|
| WO | WO 2018031788 A1 | 2/2018 |
| WO | WO 2018202693 A1 | 11/2018 |

OTHER PUBLICATIONS

Ericsson, "Motivation for Network Energy Saving in Rel-18", 3GPP Tdoc RP-212422, 3GPP TSG RAN Meeting #93-e, Electronic Meeting, Sep. 13, 2021, 8 pages.

*Primary Examiner* — Bo A Zhu
(74) *Attorney, Agent, or Firm* — Flaster Greenberg P.C.

(57) ABSTRACT

The disclosure pertains to methods and apparatus for network energy savings. A method may be implemented in a wireless transmit/receive unit (WTRU). The method may include receiving configuration information indicating a pattern of time periods during which a cell is available or unavailable and receiving a downlink control information (DCI) comprising an indication associated with an availability of the cell. The method may include determining that a resource may be included in a time period during which the cell may be determined by the WTRU to be available based on the indicated pattern of time periods and the indication. The method may include transmitting or receiving in the resource based on the resource being included in the time period during which the cell may be available.

20 Claims, 7 Drawing Sheets

Related U.S. Application Data

(60) Provisional application No. 63/327,462, filed on Apr. 5, 2022, provisional application No. 63/275,207, filed on Nov. 3, 2021.

(51) Int. Cl.
*H04W 72/231* (2023.01)
*H04W 72/232* (2023.01)

(58) Field of Classification Search
CPC .... H04W 72/56; H04L 5/0053; H04L 5/0055; H04L 5/0057
See application file for complete search history.

(56) References Cited

U.S. PATENT DOCUMENTS

| | | | |
|---|---|---|---|
| 2024/0214125 A1* | 6/2024 | Zeng | H04L 1/1861 |
| 2024/0306156 A1* | 9/2024 | Hugl | H04W 72/21 |

* cited by examiner

METHODS, ARCHITECTURES, APPARATUSES AND SYSTEMS FOR NETWORK ENERGY SAVINGS

CROSS-REFERENCE TO RELATED APPLICATIONS

This application is a continuation of U.S. patent application Ser. No. 18/706,190, filed Apr. 30, 2024, which is a U.S. National Stage Application under 35 U.S.C. § 371 of International Patent Application No. PCT/US2022/048779, filed Nov. 3, 2022, which claims the benefit of U.S. Provisional Patent Application No. 63/275,207, filed Nov. 3, 2021, and 63/327,462, filed Apr. 5, 2022, each of which is incorporated herein by reference in its entirety.

TECHNICAL FIELD

This disclosure pertains to methods, architectures, and apparatus for network energy savings.

BACKGROUND

The third-generation partnership project (3GPP) radio area network (RAN) discussed improvements related to energy savings for the wireless transmit/receive unit (WTRU) and for the network. For example, the design of the new radio (NR) release 15 allows to improve energy savings by reducing transmissions from the network in a case where there is no data. The network may consume significant energy for processing operations other than transmitting, such as, for example, baseband processing for reception and/or beamforming. Embodiments described herein have been designed with the foregoing in mind.

BRIEF SUMMARY

Methods, architectures, apparatuses, and systems directed to network energy savings are described herein. In an embodiment, a method may be implemented in a WTRU. The method may include receiving first information indicating (i) one or more scheduling request (SR) resources and (ii) a set of wake-up request occasions, wherein each SR resource may be associated with one or more levels of availability. The method may include determining that the WTRU may be at a first level of availability. The method may include transmitting a first wake-up request using a first wake-up request occasion of the set of wake-up request occasions, wherein the first wake-up request may be transmitted based on a determination that a SR may be to be transmitted using a SR resource associated with a second level of availability of the one or more levels of availability. The method may include transmitting the SR into the SR resource associated with the second level of availability. On condition that a time period after a transmission of the first wake-up request ends without receiving an availability level indication, the WTRU may transmit a second wake-up request using a second wake-up request occasion of the set of wake-up request occasions, wherein the first wake-up request may be transmitted with a first transmit power and the second wake-up request may be transmitted with a second transmit power that may be higher than the first transmit power. In an embodiment, an apparatus including any of a transmitter, a receiver, a processor, and a memory, may be configured to carry out the method described herein.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Example Communication Systems

Figure 1A:
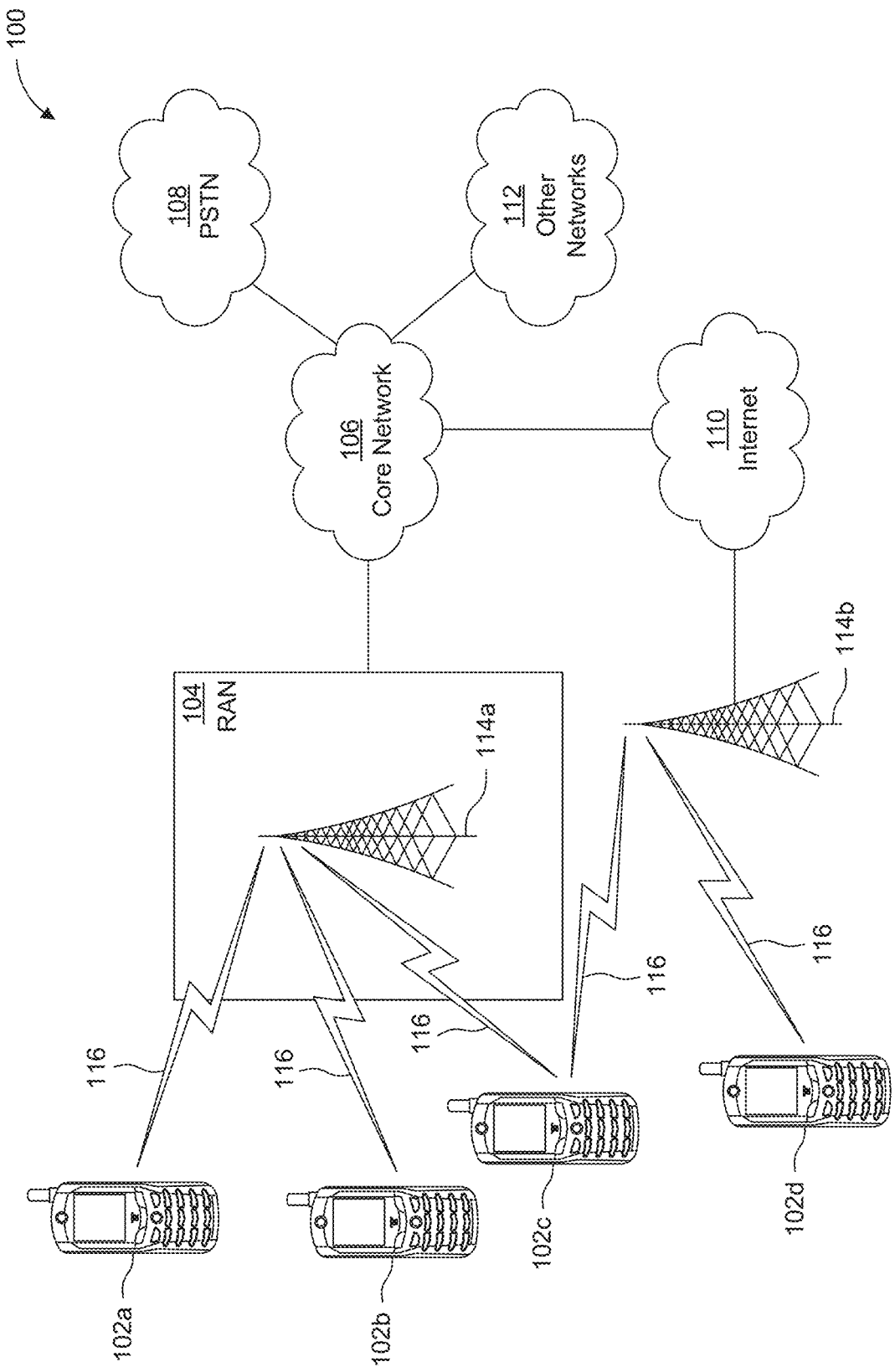
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
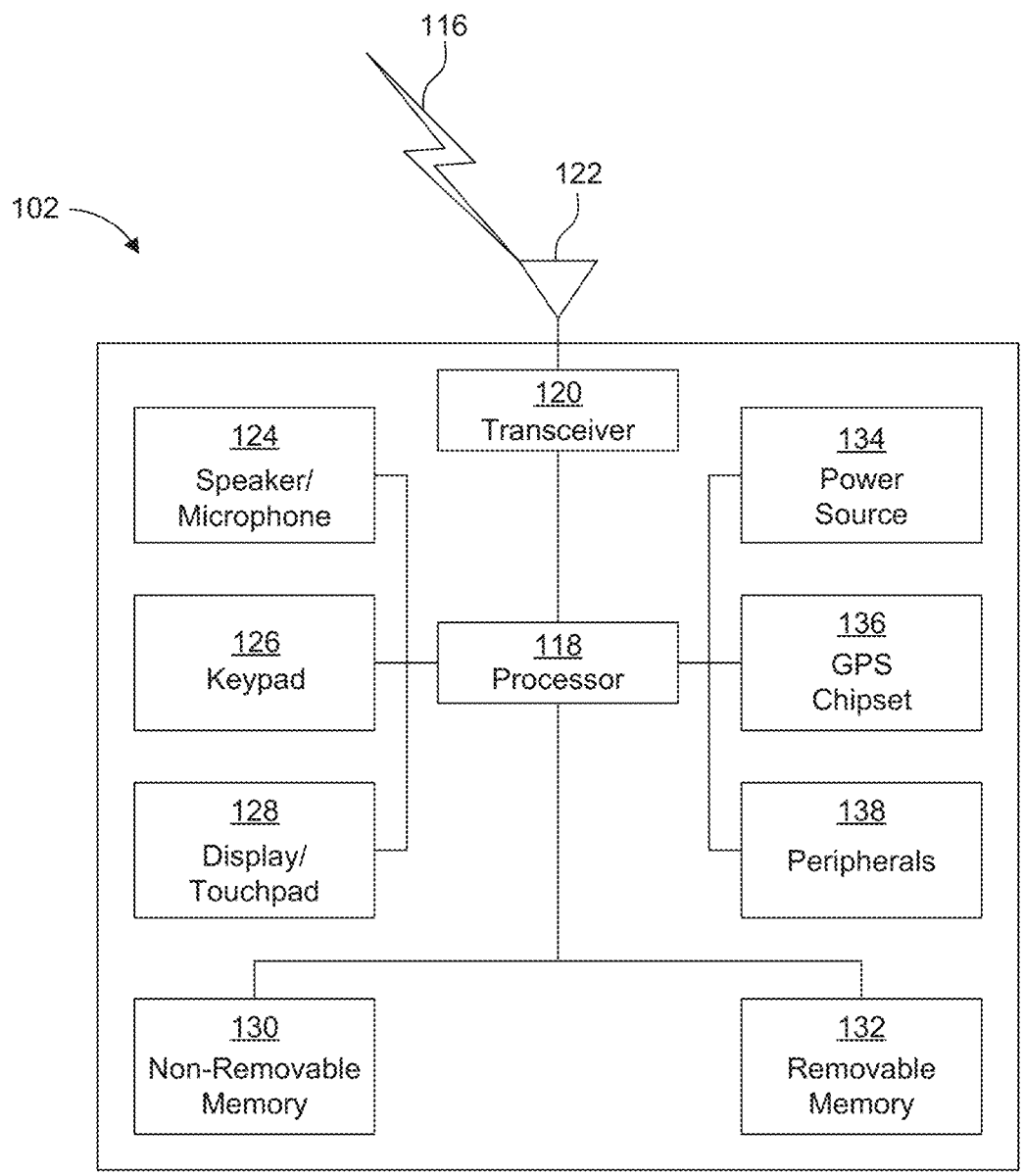
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
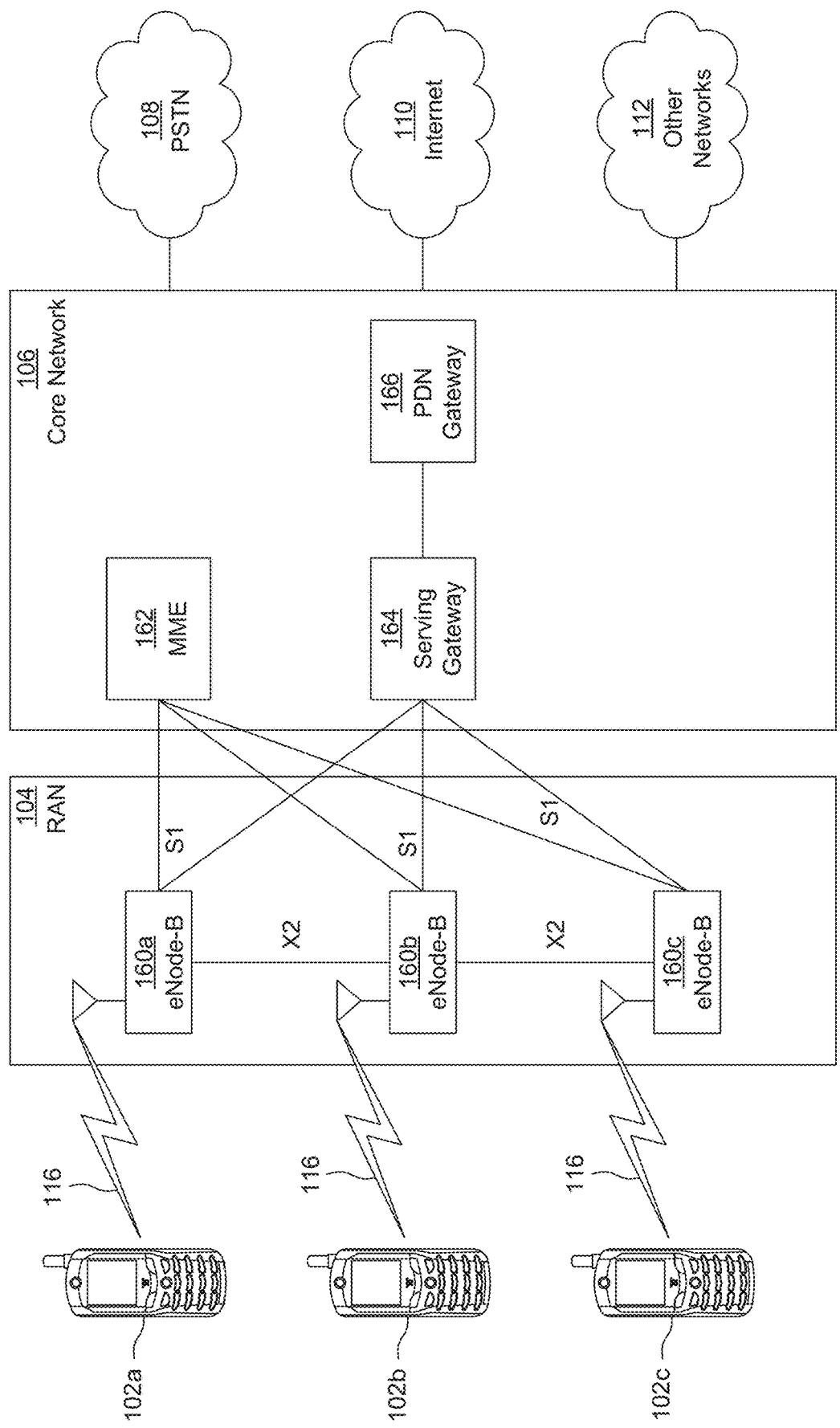
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example, in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHz, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
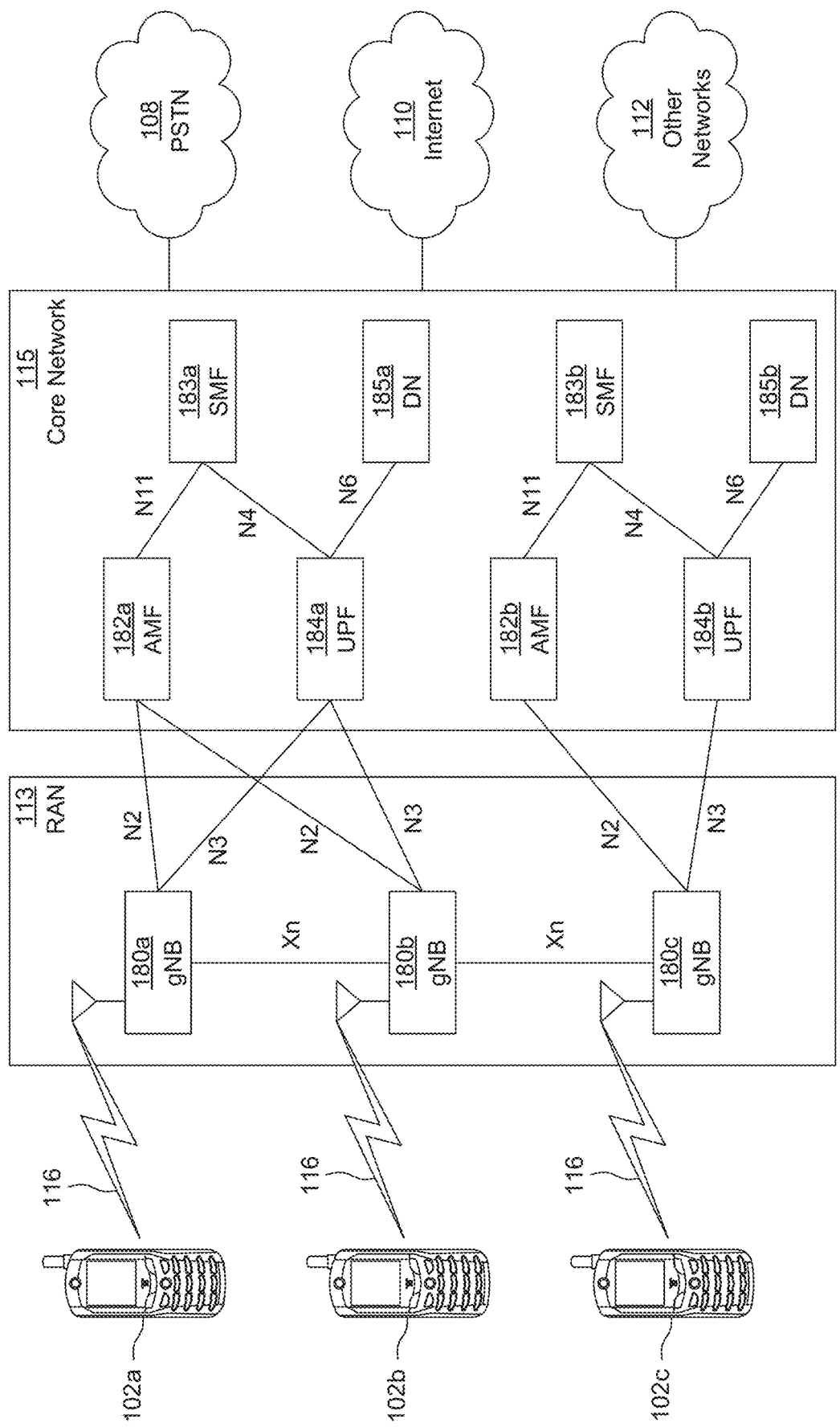
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the uplink (UL) and/or downlink (DL), support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF a 82a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Throughout embodiments described herein the terms "serving base station", "base station", "gNB", collectively "the network" may be used interchangeably to designate any network element such as e.g., a network element acting as a serving base station. Embodiments described herein are not limited to gNBs and are applicable to any other type of base stations.

For the sake of clarity, satisfying, failing to satisfy a condition and "configuring condition parameter(s) are described throughout embodiments described herein as relative to a threshold (e.g., greater or lower than) a (e.g., threshold) value, configuring the (e.g., threshold) value, etc.). For example, satisfying a condition may be described as being above a (e.g., threshold) value, and failing to satisfy a condition (e.g., performance criteria) may be described as being below a (e.g., threshold) value. Embodiments described herein are not limited to threshold-based conditions. Any kind of other condition and parameter(s) (such as e.g., belonging or not belonging to a range of values) may be applicable to embodiments described herein.

Example of Network Energy Saving

There may be a new study item in 3GPP RAN on network energy savings for Rel-18 to study enhancements enabling the network to reduce (e.g., minimize) its power consumption from any of transmission and reception. Such a reduction (e.g., minimization) may allow to reduce operational costs and improve environmental sustainability.

Compared to earlier systems, the design of NR of Rel-15 allows to reduce (e.g., minimize) transmissions from the network in a case where there is no data. For example, an always-on cell-specific reference signal (CRS) is not used in NR. For example, energy consumption (of NR Rel 15) may be further reduced.

For example, the network may consume energy for processing operations other than transmitting, such as, for example, baseband (e.g., digital) processing for reception and/or beamforming. Such "idle" power consumption may not be negligible in dense networks (e.g., even) in a case where no WTRU is served during a period of time. Turning off these processing operations when not transmitting to a WTRU may allow the network to reduce energy consumption.

For example, NR may support beamforming with up to sixty-four transmit and receive ports and the energy consumption may increase as the number of utilized ports increases. The utilization of a large (e.g., maximum, constant) number of ports may not be useful for all WTRUs in practice. Adapting the number of ports to, for example, what may be expected by one or more WTRUs, may allow to reduce energy consumption in the network.

In a 3GPP Rel-17 NR-based system, the idle power consumption reduction at the network side may remain limited in a case where there is no traffic from a WTRU, because resources may be configured by the network for the WTRU(s) such that the network may (e.g., frequently) attempt reception (e.g., from the WTRU(s)). For example, the network may configure resources for any of a scheduling request (SR), a random-access channel (RACH), and a configured grant (CG) for a (e.g., each) WTRU with a periodicity that may depend on its latency property (e.g., expectation). For example, the network may configure periodic sounding reference signal (SRS) and/or channel state information (CSI) resources e.g., for link adaptation purpose. Even during periods when the WTRU may not have any data to transmit, the network may be expected to attempt reception on these resources and transmission of CSI-RS in support of periodic CSI.

Embodiments described herein may enable the network to know (e.g., determine) when transmission and/or reception may be turned off (or a reduced number of antenna ports may be used) for such resources and to maintain the quality of service of the served WTRUS.

Overview

Throughout embodiments described herein the terms "availability state", "level of availability" and "readiness state" may be used interchangeably to designate a state among a set of (e.g., discrete) states for the WTRU, representing (e.g., associated with) a level of (e.g., expected transmit/receive) activity of the WTRU.

For example, a WTRU may determine whether it may transmit (or receive) one or more resources depending on an availability state that may be indicated (e.g., via information transmitted) by the network. In a first availability state, some resources may not be available during one or more periods of time which may enable the network to turn off baseband processing and other related processing operations (e.g., activities). Under one or more conditions, the WTRU may further transmit a request to the network (such as e.g., a wake-up request) to change from the first availability state to a second availability state for which resources that may satisfy WTRU expectations may be available. Such a wake-up request may correspond to a transmission that may be decodable by a low-complexity receiver at the gNB for which energy consumption may be reduced.

An availability state of a WTRU may imply (e.g., be associated with) a power savings state of the gNB. In an embodiment, the WTRU may determine (e.g., to be in) an "availability state" according to one or more of the following examples.

In an example, the WTRU may determine (e.g., to be in) an availability state based on a reception of an availability state (e.g., level) indication from e.g., any of a group-common physical downlink control channel (PDCCH), a MAC control element (MAC CE), and a WTRU-specific downlink control information (DCI). The terms "availability state indication" and 'availability level indication" may be used interchangeably throughout embodiments described herein to refer to any transmission indicating that the WTRU may be in an availability state.

In another example, the WTRU may determine (e.g., to be in) an availability state after any of a reception of a signal indicating a wake-up response and a transmission of a signal indicating a "wake-up request".

In yet another example, the WTRU may determine (e.g., to be in) in a default availability state. For example, a first/second availability state may be valid for a period of time after any of (i) a reception of any of an availability state indication and a wake-up response signal and (ii) a transmission of a wake-up request signal, at the expiry of which the WTRU may determine to be a default availability state.

In yet another example, the WTRU may determine (e.g., to be in) in a first/second availability state upon a determination that an amount of time has elapsed after transmission of a wake-up request signal or after reception of an availability state indication.

In an embodiment, the WTRU may determine whether a resource is available for transmission/reception for the determined availability state according to one or more of the following examples.

In an example, the WTRU may determine whether a resource is available for transmission/reception for the determined availability state based on whether the resource may be for any of a scheduling request (SR), a configured grant, a SRS, a channel state information reference signal (CSI-RS), a physical random-access channel (PRACH), etc.

In another example, the WTRU may determine whether a resource is available for transmission/reception for the determined availability state based on a (e.g., maximum) number of ports associated with the resource. A resource may be characterized by (e.g., associated with) a (e.g., maximum) number of ports (e.g., available number of ports may depend on availability state).

In yet another example, the WTRU may determine whether a resource is available for transmission/reception for the determined availability state based on receiving (e.g., explicit) configuration information indicating any of the availability of a resource for a (e.g., each) availability state, a time mask pattern associated to a (e.g., each) availability state, etc.

In yet another example, the WTRU may determine whether a resource is available for transmission/reception for the determined availability state based on the periodicity of the resource.

In an embodiment, the WTRU may receive information indicating a configuration of resources for one or more "wake-up request" (WUR) according to one or more of the following examples.

In an example, the configuration of resources for one or more WUR may include resource properties such as any of a scrambling initiator, a set of time occasions, a frequency span, and a spatial filter.

In another example, the configuration of resources for one or more WUR may include a power control configuration.

In yet another example, the configuration of resources for one or more WUR may include any parameters that may be used in a WUR procedure (such as e.g., a maximum number of repetitions, a "prohibit" timer, etc.)

In an embodiment, the WTRU may initiate a "wake-up request" procedure (e.g., may transmit a WUR) in a case where one or more of the following conditions occur (e.g., are met).

In an example, the WTRU may transmit a WUR in a case where a SR is triggered and/or no resource is available for SR with a current availability state, e.g., within a latency limit.

In another example, the WTRU may transmit a WUR in a case where a buffer status reporting (BSR) is triggered and/or no resource is available for the transmission of the BSR MAC CE in a current availability state, e.g., within a latency limit.

In yet another example, the WTRU may transmit a WUR in a case where no grant is available for transmitting data available for transmission (e.g., considering logical channel prioritization (LCP) restrictions), e.g., within a latency threshold.

In yet another example, the WTRU may transmit a WUR in a case where a buffer status satisfies a condition (e.g., is higher than a threshold).

In yet another example, the WTRU may transmit a WUR in a case where any of a mobility and a channel-related event is triggered (such as e.g., radio resources management (RRM) event, bidirectional forwarding detection (BFD)).

In yet another example, the WTRU may transmit a WUR in a case where channel measurements satisfy or fail to satisfy a condition (e.g., being above or below a configured threshold). For example, channel measurements satisfying or failing to satisfy a condition may include any of (i) measured received signal strength indicator (RSSI) and/or reference signal-signal to interference noise ratio (RS-SINR) being above or below a threshold, (ii) lack of synchronization signal block (SSB) samples to measure, and (iii) no primary synchronization signal/secondary synchronization signal (PSS/SSS) may be detected.

In yet another example, the WTRU may transmit a WUR in a case where an availability signal is detected according to any embodiment described herein.

In yet another example, the WTRU may transmit a WUR in case of arrival of uplink data to a secondary cell group (SCG) bearer.

In yet another example, the WTRU may transmit a WUR in case of arrival of data from any of data resource bearers DRBs and (e.g., any of some) signaling radio bearers (SRBs).

In yet another example, the WTRU may transmit a WUR in a case where any of an RRC state change and an RRC procedure (e.g., RRC resume, RRC establishment, RRC re-establishment, etc.) is triggered.

In yet another example, the WTRU may transmit a WUR in a case where an RRC message (e.g., RRC release) is received.

In yet another example, the WTRU may transmit a WUR in a case where any of a positioning procedure is performed, information indicating a positioning report is transmitted, and a location is determined that may be within the cell's coverage as the e.g., best server.

In yet another example, the WTRU may transmit a WUR in case of any trigger described herein in relation to transmitting a wake-up request. In an embodiment, the WTRU may select a wake-up request resource (and/or the WUR payload) according to one or more of the following examples of information.

In an example, the WTRU may select a wake-up request resource (and/or the WUR payload) based on a target availability state. For example, the wake-up request resource may be selected in a case where the wake-up request resource is associated with the target availability state.

In yet another example, the WTRU may select a wake-up request resource (and/or the WUR payload) based on an indication of a resource to be used.

In yet another example, the WTRU may select a wake-up request resource (and/or the WUR payload) based on an indication of what triggered the wake-up request (any of a SR ID, a logical channel ID, a logical channel priority, a buffer status, etc.).

In yet another example, the WTRU may select a wake-up request resource (and/or the WUR payload) based on a timing of the occasion for the resource to use.

In an embodiment, the WTRU may start a timer.

In an embodiment, the WTRU may transmit and/or receive on the resource available according to the requested availability state. This transmission and/or reception may take place any of before receiving any information from the network indicating the availability state, and after receiving information indicating (e.g., confirming) the availability state.

In an embodiment, the WTRU may complete the wake-up request procedure in a case where one or more of the following conditions occur.

In a first example, the WTRU may complete the wake-up request procedure in a case where the WTRU receives information indicating an availability state.

In another example, the WTRU may complete the wake-up request procedure in a case where the WTRU receives (any) unicast PDCCH.

In yet another example, the WTRU may complete the wake-up request procedure in case of timer expiry according to any embodiment described herein.

In yet another example, the WTRU may complete the wake-up request procedure in a case where a (e.g., maximum) number of wake-up request transmissions is reached. The WTRU may report this event by transmitting information in any of DCI, a MAC CE, and a radio resource control (RRC) message.

Figure 2:
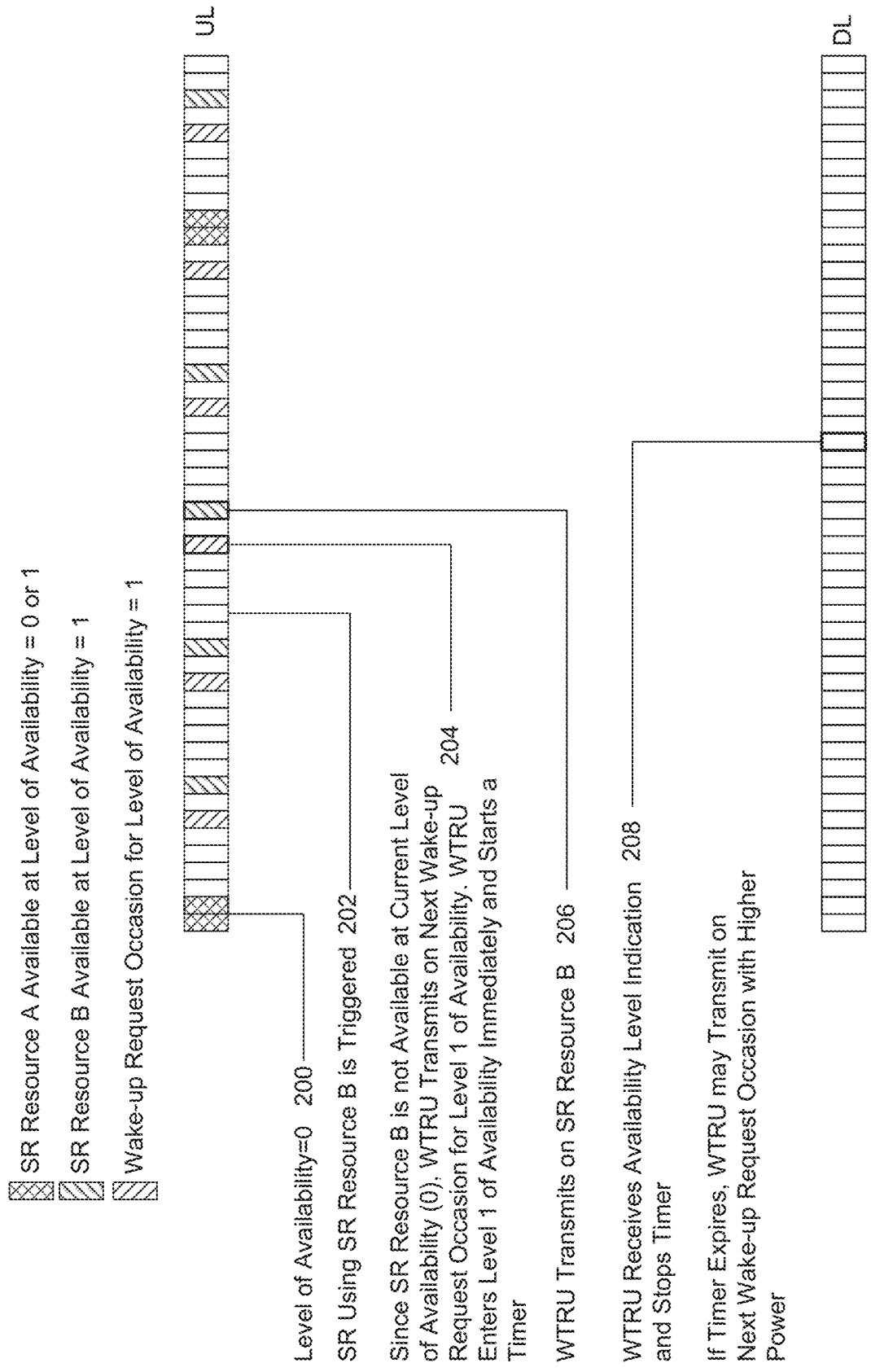
FIG. 2 is a transmission timing diagram illustrating an example of WTRU operation enabling network energy savings.

FIG. 2 is a transmission timing diagram illustrating an example of WTRU operation enabling network energy savings. For example, the WTRU may have received first information indicating (i) one or more SR resources and (ii) a set of wake-up request occasions, wherein a (e.g., each) SR resource may be associated with one or more levels of availability, such as e.g., level 0, level 1, etc. For example, the WTRU may determine to be at a first level (e.g., level 0) of availability.

At time 200, there may be SR resources that may be available (e.g., associated with) any of the first level of availability (e.g., level 0) and a second level of availability (e.g., level 1).

At time 202, the WTRU may determine that a SR may be to be transmitted using a SR resource associated with the second level (e.g., level 1) of availability of the one or more levels of availability.

At time 204, e.g., in absence of SR resources associated with the second level (e.g., level 1) of availability, the WTRU may transmit a first wake-up request using a first wake-up request occasion of the set of wake-up request occasions. For example, the WTRU may start a timer for monitoring reception of an availability level indication.

At time 206, the WTRU may transmit the SR in the SR resource associated with the second level of availability.

At time 208, the WTRU may receive a transmission indicating an availability level indication and may stop the timer. If the timer expires (e.g., if a time period after a transmission of the first wake-up request ends) without receiving an availability level indication, the WTRU may transmit a second wake-up request using a second wake-up occasion of the set of wake-up request occasions, wherein the first wake-up request may be transmitted with a first transmit power and the second wake-up request may be transmitted with a second transmit power that may be higher than the first transmit power.

Example of Determination of Availability State

The WTRU may determine an availability state out of a number of availability states based on any of the following examples. For example, there may be two availability states ("On" and "Off"), three availability states (e.g., "Deep sleep", "Micro-sleep", "On"), or four availability states (e.g., "Off", "Deep sleep", "Micro-sleep", "On"). An availability state may be applicable to (e.g., associated with) at least one resource, and a resource may be associated with one or more availability states. An availability state may be applicable to at least one time period such as any of a time slot and a time symbol. An availability state may be applicable to (e.g., associated with) any of a serving cell, a cell group, a frequency band, a bandwidth part, and a range of frequencies within a bandwidth part.

Examples of Reception of DCI or MAC CE

In an embodiment, the WTRU may receive information in (e.g., an indication from) any of downlink control information (DCI) and a MAC control element and may determine the availability state based on such information (e.g., an indication). For example, the information (e.g., indication) may be included in a group common PDCCH. The information (e.g., indication) may indicate at least one identity of an availability state for at least one time period such as e.g., any of a symbol, a slot, and a frame. For example, the information (e.g., indication) may correspond to an index to a table where an (e.g., each) entry of the table may indicate a sequence of availability states applicable to a sequence of respective time symbols e.g., from the start of an upcoming time slot. The table may be pre-defined or may be configured by receiving configuration information based on e.g., RRC messages.

In another example, the information (e.g., indication) may comprise a MAC CE indicating an index to an availability state. The availability state may be applicable starting from a delay after reception of the MAC CE or from a delay after transmission of a hybrid automatic repeat request acknowledgement (HARQ-ACK) acknowledging the physical downlink shared channel (PDSCH) carrying the MAC CE. The WTRU may start a timer at that time. The availability state may be applicable until any of reception (or transmission) of signaling indicating (e.g., triggering) a new availability state, and until expiry of the timer. At least one of the delay and timer may be any of pre-defined, signaled in the MAC CE and configured by receiving configuration information e.g., based on RRC.

Example of Reception of an Availability State Indication Signal

Throughout embodiments described herein the terms "availability state indication", "availability state indication signal", "level of availability indication" and ""level of availability indication signal", "transmission indicating an availability state indication", and "transmission indicating an availability level indication" may be used interchangeably to designate any transmission acknowledging that the WTRU may be in an availability state (e.g., at an availability level).

In an embodiment, the WTRU may determine (e.g., to be in) an availability state from detection (e.g., reception) of an availability state indication (ASI) signal. Such a signal may be generated from at least one sequence such as e.g., any of a Zadoff-Chu, an M-sequence, and a gold sequence. The WTRU may attempt to detect such a signal during one or more occasions. Such occasions may be tied to (e.g., associated with) SSB (synchronization signal block) transmission times for the serving cell according to a (e.g., defined) timing relationship. Information indicating any of the timing of ASI signal occasions and timing relationship of the ASI signal with SSB may be received by the WTRU (e.g., indicated by higher layers such as from system information). The WTRU may determine (e.g., to be in) the availability state based on at least one property of the availability state indication. For example, the at least one property may include any of a parameter used for the generation of the at least one sequence, a time offset and a frequency offset. The parameter and/or offset may be any of pre-defined and signaled (e.g., indicated) by higher layers (e.g., information, signaling), such as system information. The indicated availability state may be applicable until the next (e.g., a subsequent) ASI signal occasion.

Example of Transmission of a Wake-Up Request or Reception of Wake-Up Response

In an embodiment, the WTRU may determine (e.g., to be in) an availability state after any of a transmission of a wake-up request signal, and a reception of a wake-up response signal. The wake-up response signal may be a DL signal (e.g., or channel), including any of an SSB signal, a reference signal, a measurement resource, a PDCCH transmission, and a PDSCH transmission. In another example, the wake-up response may be indicated by a downlink RRC message. The availability state may be applicable from a delay (that may be down to zero) after transmission of the wake-up request or reception of the wake-up response. The availability state may be indicated by the wake-up response signal. For example, the WTRU may determine the availability state based on a property of the wake-up response signal according to any embodiment described herein for the availability state indication signal.

Example of Higher Layer Configuration and Signaling

In an embodiment, the WTRU may determine (e.g., to be in) an availability state based on receiving (e.g., higher layer) signaling messages such as e.g., RRC. For example, the WTRU may receive information indicating an initial availability state for a serving cell in an RRC message such as e.g., any of an RRC connection setup and an RRC (re)-configuration message. Information indicating an (e.g., initial) availability state for a serving cell may be received in a broadcast transmission indicating broadcast configurations. In another example, The WTRU may receive information indicating the availability state to apply upon activation of a serving cell and/or upon switching to a bandwidth part, for at least one serving cell and bandwidth part. For example, the WTRU may receive information indicating to switch to an availability state in part of an (e.g., RRC) message (such as e.g., any of a DL DCCH message, a DL common control channel (CCCH) message, an RRC release message, an RRC suspend message, and an RRC establishment message confirmation).

Example of RRC Connection State or Mode

For example, the WTRU may determine (e.g., to be in) the availability state based on the (e.g., RRC) connection state or mode. For example, the WTRU may determine (e.g., to be in) the availability state from reception of an indication multiplexed part of an (e.g., RRC) message. The WTRU may be any of configured and predefined with a default availability state, which may or may not be specific to (e.g., associated with) a (e.g., certain RRC) state. For example, the WTRU may autonomously determine an availability state after transitioning into inactive state.

Example of Default Availability State

In an embodiment, the WTRU may determine (e.g., to be in) a default availability state. The WTRU may determine to be in the default availability state after an amount of time has elapsed after having determined (e.g., to be in) an availability state according to any embodiments described herein. The WTRU may determine to be in the default availability state in a time interval for which no applicable availability state may otherwise be determined. For example, in a case where the WTRU does not detect (e.g., receive) signaling information indicating an availability state in an occasion for a PDCCH or ASI signal, the WTRU may determine (e.g., to be in) the default availability state for the time interval applicable to the PDCCH or ASI signal, such as the time interval between that occasion and a subsequent occasion.

Example of Determination of the Availability State from Lack of Reception of an ASI Signal The WTRU may monitor for reception of an availability state indication signal (ASI) or channel from the gNB associated with one or more availability states (e.g., On or micro sleep). For example, the WTRU may be configured with (e.g., may receive configuration information indicating) any of a periodicity associated with an availability indication signal e.g., per cell, and a monitoring occasion pattern for the detection of the cell's availability state indication signal. The availability state indication signal may be a DL signal (e.g., or channel), including any of an SSB signal, a reference signal, a PDCCH transmission, and a PDSCH transmission. For a (e.g., each) cell or carrier, the WTRU may be configured with (e.g., may receive configuration information indicating) an association between SSB(s) (e.g., or other DL signals) and an availability signal for the cell. For example, an availability state may not be active in a case where the WTRU does not detect (e.g., receive) an availability state indication signal associated with the state (e.g., any of SSB and CSI-RS). For example, the availability state may be any of Off, micro-sleep, and deep sleep in a case where the WTRU does not detect (e.g., receive) an availability state indication signal associated with the availability state "On".

The WTRU may determine that an availability state indication signal or a wake-up response signal is not detected (e.g., received) in a case where the signal is measured with a quality metric (such as e.g., any of a radio signal receive power (RSRP) and a signal to interference noise ratio (SINR)) failing to satisfy a strength condition (e.g., below a (e.g., configured) threshold).

For example, the WTRU may use a counter or a detection timer before changing an active availability state or making an availability state determination based on the ASI, whereby the WTRU may (e.g., only) change the availability state if the timer expires or if the WTRU counts a consecutive number of missing samples of the availability state indication signal. For example, the WTRU may determine (e.g., to be in) an availability state based on a lack of reception of an ASI signal. For example, the lack of reception of an ASI signal may be determined based on not detecting (e.g., not receiving) any ASI for any of a period of time and a number of consecutive missing samples of ASI signal. For example, the WTRU may be configured with (e.g., receive configuration information indicating) a period for measuring availability state indication signal samples. In a case where the determined measurement over this period satisfies a condition (e.g., is greater than a threshold), the WTRU may stop or (re)-start the detection timer or reset the counter. In a case where the determined measurement of the availability signal over this period does not satisfy the condition (e.g., is less than the threshold), the WTRU may increment the counter and/or the WTRU may (re)-start the detection timer.

Example of Determination of Resource Availability for an Availability State

How the WTRU may determine what resource may be available for a (e.g., each) state is described herein. For example, which resource may be available for which state may be based on any of explicit configuration information and a time pattern.

For any of default resources and additional resources, the WTRU may determine if a resource is available for transmission or reception for a (e.g., given) availability state using one or more of the following techniques.

A resource may correspond to any of the following examples.

In an example, a resource may correspond to a physical uplink control channel (PUCCH) resource e.g., configured for any of a HARQ-ACK (e.g., semi-persistent scheduling HARQ-ACK), a scheduling request (SR), a link recovery request (LRR), and periodic (e.g., or semi-persistent) CSI.

In another example, a resource may correspond to a physical uplink shared channel (PUSCH) resource e.g., configured for configured grant type 1 and/or type 2.

In yet another example, a resource may correspond to a PRACH resource. For example, any of a PRACH configuration and a subset of PRACH resources may be configured as available (e.g., only) in (e.g., associated with) a subset of availability states.

In yet another example, a resource may correspond to an SRS resource.

In yet another example, a resource may correspond to a CSI-RS resource (e.g., configured for any of CSI reporting, beam failure detection or recovery, radio link monitoring, and measurements).

In yet another example, a resource may correspond to a positioning reference signal (PRS) resource.

In yet another example, a resource may correspond to a PDCCH resource and/or an associated Coreset.

In yet another example, a resource may correspond to a PDSCH resource (e.g., configured for semi-persistent scheduling).

In yet another example, a resource may correspond to a SSB resource.

In some embodiments, the WTRU may determine that a resource indicated by DCI (e.g., excluding resources activated by DCI) may be available for any availability state. For example, the WTRU may determine that a resource activated by any of DCI and MAC CE may be available for any availability state. For example, a subset of uplink resources (such as e.g., PRACH, PUCCH, or PUSCH) may be activated following successful reception of the gNB's response to the wake-up request, such as a DL wake-up signal associated with the wake-up receiver radio at the WTRU. For example, a subset of uplink resources may be activated following the transmission of the wake-up signal.

Example of Explicit Resource Configuration

In some embodiments, the WTRU may receive configuration information (e.g., in a RRC message) indicating the resources that may be available for (e.g., associated with) a (e.g., each possible) availability state. The WTRU may, for example, receive configuration information indicating the resources that may be available in any availability state. Such resources may be referred to as "minimum resources" and resources available (e.g., only) in a subset of the availability states may be referred to as "additional resources". The configuration may correspond to at least one additional information element for a (e.g., each) resource indicating at least one state in which the resource may be available. In another example, the configuration may correspond to additional information elements indicating, for a (e.g., each) state, the resources (e.g., additional resources) available for (e.g., associated with) the availability state.

Examples of Additional State-Specific Parameters

In some embodiments, the WTRU may receive information indicating, for at least one parameter of a resource, configuration of the value that the at least one parameter may take for a (e.g., each) availability state. For example, a periodicity parameter may take a first (second) value in a first (second) availability state. In another example, a parameter indicating a number of ports may take a first (second) value in a first (second) availability state.

Example of Time Pattern

In some embodiments, the WTRU may receive configuration information (e.g., via any of RRC and MAC CE) indicating a set of time intervals e.g., a time pattern for a (e.g., each) availability state. Such a time pattern may indicate time intervals during which a resource may be available (or not available) for the availability state. For example, a time pattern may correspond to a sequence of bits (e.g., a bitmap) corresponding to a respective sequence of time units such as any of a time symbol, a slot, and a frame. The WTRU may determine that a resource such as a periodically or semi-persistently recurring (e.g., repeated) resource may be available for a (e.g., given) recurring (e.g., repeated) instance in a case where the time pattern indicates that it is (e.g., fully) included (or e.g., partly included) in time intervals for which the time pattern may indicate availability.

In case of PRACH, the WTRU may receive configuration information indicating a subset of PRACH occasions for a (e.g., each) availability state.

Maximum Periodicity

In some embodiments, the WTRU may determine that a periodically or e.g., a semi-persistently recurring (e.g., repeated) resource may be available for an availability state in a case where the periodicity of the resource satisfies a condition (e.g., is larger than (or larger than or equal to) a threshold configured for) e.g., associated with this state. For example, in a case where the threshold is of 2 slots (e.g., per time unit) for an availability state, a resource may be available in this availability state in a case where its periodicity is of 2 slots or more (e.g., per time unit), and not available otherwise. The condition (e.g., threshold) applicable to (e.g., associated with) a state may be configured by RRC (e.g., by receiving configuration information indicating the condition) or may be signaled (e.g., indicated) in a MAC CE indicating an availability state.

Maximum Number of Antenna Ports

In an embodiment, the WTRU may determine that a resource may be available for an availability state in a case where the number of antenna ports associated with or configured for the resource satisfies a condition (e.g., is smaller than (or smaller than or equal to) a threshold configured for) e.g., associated with this state. The condition (e.g., threshold) applicable to (e.g., associated with) a state may be configured by RRC (e.g., by receiving configuration information indicating the condition) or may be signaled (e.g., indicated) in a MAC CE indicating an availability state.

Example of Adaptation of DL Resources Per Availability State

Radio Resource Management (RRM)/Radio Link Management (RLM)/Beam Failure Detection (BFD)

For example, the WTRU may be configured with (e.g., receive configuration information indicating) any of different beam failure detection and RLM resources to monitor per availability state.

For example, the WTRU may monitor any of additional RLM, RRM, and BFD resources (e.g., reference signal (RS) or SSBs) after transmitting a wake-up request signal, or after receiving the wake-up request response. Transmitting a wake-up request from a (e.g., certain) availability state may imply (e.g., indicate) a request for any of additional RLM, RRM, and BFD resources to be transmitted by the network (NW) and to be monitored by the WTRU.

SSBs/RS

For example, the WTRU may be configured with (e.g., receive configuration information indicating) a different set of SSBs and/or CSI-RS to monitor per availability state. For example, the WTRU may be configured with (e.g., receive configuration information indicating) a different monitoring periodicity for the applicable SSB(s) and/or CSI-RS per availability state. For example, the WTRU may adjust measurement occasions according to the periodicities of the applicable SSB(s) and/or CSI-RS associated with the active availability state. For example, the WTRU may (e.g., only) measure SSB and/or CSI-RS samples in the occasions applicable to the active availability state. For example, the WTRU may skip configured measurement gaps that may not overlap with applicable SSB and/or CSI-RS occasions in the active availability state, according to the configured SSB(s) and/or CSI-RS periodicities associated with the availability state.

PDCCH Monitoring

For example, the WTRU may be configured with (e.g., receive configuration information indicating) a different set of any of coresets, search spaces, and PDCCH occasions to monitor per availability state. Within a configured coreset or search space, the WTRU may be configured with (e.g., receive configuration information indicating) a PDCCH occasion mask which may indicate to the WTRU which subset of PDCCH occasions to monitor or skip within the configured coreset or search space. For example, the WTRU may monitor PDCCH (e.g., only) in the occasions applicable to the active availability state. The WTRU may skip PDCCH occasions that may not be transmitted in the active availability state.

Example of Linkage Between WTRU Power Savings State and Availability State

In an embodiment, the WTRU may be configured or predetermined with an association between a WTRU power savings state and an availability state. For example, the WTRU may switch its WTRU power savings state to the one associated with the active availability state. For example, the WTRU may determine the active availability state based on an active WTRU power savings state. For example, the WTRU may determine the active availability state based on a (e.g., signaled) WTRU power savings state (e.g., based on receiving information indicating a WTRU power savings state). For example, the WTRU may apply associated resource and measurement configurations configured for the availability state and/or the WTRU power saving state. A WTRU power savings state may include at least one of the following examples.

In an example, a WTRU power savings state may include a DRX state (active vs. inactive).

In another example, a WTRU power savings state may include a DRX cycle (long vs. short).

In yet another example, a WTRU power savings state may include a primary or a secondary DRX.

In another example, a WTRU power savings state may include an indication of whether the WTRU monitors a wake-up signal from the network.

In another example, a WTRU power savings state may be associated with a number of active antenna chains or elements In another example, a WTRU power savings state may include any of an RRM and a RLM relaxation state.

In another example, a WTRU power savings state may include a PDCCH skipping state.

Example of WUR Signal Determination

In some embodiments, a WUR signal may be a sequence (e.g., any of a Zadoff-Chu, an m-sequence, and a gold-sequence). For example, a set of sequences may be any of reserved, configured, and used for a WUR signal indication. A WTRU may determine a sequence for a WUR transmission within the set of sequences to indicate associated information for a WUR signal, wherein the associated information may include one or more of the following examples of information.

In an example, a sequence among the set of sequences may be associated with (e.g., may indicate) a coverage level of the WTRU, wherein the coverage level of the WTRU may be determined based on any of: (1) the latest coverage level of the WTRU before the network may have moved to an idle state (e.g., dormant state), (2) the latest coverage level of the WTRU before the WTRU may have moved to an idle state (e.g., inactive state), and (3) the proximity to the gNB (e.g., based on the WTRU location and the gNB location).

In another example, a sequence among the set of sequences may be associated with (e.g., may indicate) a geographical location, wherein the geographical location information may be determined based on any of: (1) a zone identity in which the WTRU may be located (e.g., one or more zones may be configured by a gNB and a WTRU may determine a zone (e.g., identity) based on the WTRU location), wherein a (e.g., each) zone may be associated with a sequence, and (2) an absolute WTRU location.

In yet another example, a sequence among the set of sequences may be associated with (e.g., may indicate) a measurement of a reference signal, wherein the reference signal may be measured e.g., periodically by the gNB.

In yet another example, a sequence among the set of sequences may be associated with (e.g., may indicate) a WTRU buffer status.

In yet another example, a sequence among the set of sequences may be associated with (e.g., may indicate) a traffic type (such as e.g., any of URLLC, enhanced mobile broadband (eMBB), and massive machine type communication (mMTC)).

In yet another example, a sequence among the set of sequences may be associated with (e.g., may indicate) a WTRU type (such as e.g., any of low capability WTRU, high capability WTRU) which may be determined based on any of the number of Rx antennas, the supporting bandwidth, the power class, etc.).

In yet another example, a sequence among the set of sequences may be associated with (e.g., may indicate) an expected (minimum) bandwidth.

In yet another example, a sequence among the set of sequences may be associated with (e.g., may indicate) a determined SSB index (or e.g., a preferred beam information).

In some embodiments, a WUR signal may be an UL signal (such as e.g., any of PRACH, PUCCH, SRS, demodulation reference signal (DMRS)). For example, a set of UL signal resources may be any of reserved, configured and used for (e.g., transmitting) a WUR signal indication. For example, a WTRU may determine a UL signal resource for a WUR transmission within the set of UL signal resources to indicate associated information for a WUR signal.

Example of WUR Signal Based on Coverage Level

In some embodiments, a WUR signal may be defined, designed, or configured based on the coverage level of the WTRU. For example, the coverage level of the WUR signal may be determined based on one or more of the following examples.

In an example, the WUR signal may be determined based on a waveform (e.g., a first waveform may be used in a case where a WTRU is within a first coverage level and a second waveform may be used in a case where a WTRU is within a second coverage level, and the first waveform may be based on cyclic prefix OFDM (CP-OFDM) and the second waveform may be based on discrete Fourier transform spread OFDM (DFT-s-OFDM)).

In another example, the WUR signal may be determined based on a number of repetitions (e.g., a larger number of repetitions may be used for a WUR in a case where a WTRU is within a worse coverage level).

In yet another example, the WUR signal may be determined based on a sequence length (e.g., a first sequence length may be used for a WUR in a case where a WTRU is within a first coverage level and a second sequence length may be used for a WUR when a WTRU is within a second coverage level, wherein the first sequence length may be longer than the second sequence length in a case where the first coverage level is worse than the second coverage level).

In yet another example, the WUR signal may be determined based on a sequence type.

In yet another example, the WUR signal may be determined based on a number of tones (e.g., subcarriers) used for a WUR.

In yet another example, the WUR signal may be determined based on a subcarrier spacing used for a WUR (e.g., a smaller subcarrier spacing may be used in a case where a WTRU is within a worse (e.g., lower) coverage level).

Example of gNB Response to a WUR Signal

In some embodiments, a WTRU may expect to receive a gNB response after sending a WUR signal, wherein the gNB response may include one or more of the following examples.

In an example, the gNB response may include an SSB (e.g., an SSB associated with the WUR signal).

In another example, the gNB response may include information indicating a PDCCH (or a search space) associated with the WUR signal.

In yet another example, the gNB response may include a reference signal (such as e.g., any of a tracking reference signal (TRS) and a CSI-RS) associated with the WUR signal.

For example, in a case where no gNB response is detected (e.g., received) within a time window after sending a WUR signal, the WTRU may perform one or more of the following examples of operation.

In an example of operation, in a case where a time period after a transmission of the WUR ends without receiving a gNB response, the WTRU may increase transmission power of the WUR signal (e.g., increase transmission power with an offset).

In another example of operation, the WTRU may increase coverage level of the wake-up request signal (WUR).

In yet another example of operation, the WTRU may change the WUR type.

In yet another example of operation, the WTRU may determine that the serving cell may be out of coverage and may perform initial cell search.

Wake-up Request Resource Configuration

In some embodiments, the WTRU may receive configuration information indicating one or more wake-up request (WUR) resources. The configuration information may include (e.g., indicate) any of (i) parameters for initializing at least one sequence, (ii) parameters determining a set of (e.g., possible) time occasions, (iii) frequency-domain information, and (iv) spatial filter (beam) information. The configuration information may, for example, include (e.g., indicate) parameters that may be used in a WUR procedure such as e.g., any of a (e.g., maximum) number of repetitions, the value of a "prohibit" timer, and the value of a timer (e.g., time period) for transitioning back to a default availability state.

The WUR resource (e.g., indicated in) configuration information may be dependent or selected based on one or more of the following examples.

In a first example, a WUR resource may be associated with one or more availability states and may be selected based on an availability state requested by the WTRU.

In another example, a WUR resource may be associated with a scheduling request.

In yet another example, a WUR resource may be dependent or selected based on any of a logical channel identity and a logical channel priority for which data may be available for transmission (e.g., for which a SR may be to be transmitted).

In yet another example, a WUR resource may be dependent or selected based on an amount of data available for transmission.

In yet another example, a WUR resource may be dependent or selected based on a type of trigger (such as any trigger described herein).

In yet another example, a WUR resource may be dependent or selected based on a coverage level as described herein.

In some embodiments, in a case where the WUR comprises a set of modulated symbols, any of the parameters described hereabove may be encoded and mapped to (e.g., associated with) the modulated symbols.

For example, the WTRU may receive configuration information indicating power control parameters applicable to the WUR. For example, such parameters may include any of an offset P0 to an estimated path loss and an alpha parameter.

Wake up request triggering and procedure are described herein.

Wake-up Request Triggering and Procedure

Wake up request triggering and procedure are described herein.

Examples of Conditions for Transmitting a Wake-up Request

The WTRU may transmit (e.g., trigger the transmission of) a wake-up request signal in a case where one or more of the following examples of conditions are met.

In an example, the WTRU may transmit (e.g., trigger the transmission of) a wake-up request signal in case of arrival of new data (e.g., from a subset of any of data resource bearers (DRBs), SRBs, logical channels (LCHs), and logical channel groups (LCGs), which may be associated with any of a priority level and an index).

In another example, the WTRU may transmit (e.g., trigger the transmission of) a wake-up request signal in case of a transmission on an associated uplink resource (e.g., the WTRU may trigger a wake-up request in a case where a transport block (TB) can be transmitted on a subset of associated resources (e.g., any of PUSCH, PUCCH, and PRACH resources)).

In yet another example, the WTRU may transmit (e.g., trigger the transmission of) a wake-up request signal in a case where an amount of buffered data satisfies a condition (e.g., is above a threshold). The WTRU may trigger a wake-up request, for example, if the amount of buffered data is above a configured or predefined threshold, e.g., from a subset of any of DRBs, LCHs, and LCGs).

In yet another example, the WTRU may transmit (e.g., trigger the transmission of) a wake-up request signal in a case where any of a buffer status reporting (BSR) and a SR is triggered (e.g., determined to be transmitted). The WTRU may trigger a wake-up request, for example, in a case where a new BSR and/or a new SR is triggered, e.g., if the new SR is for (e.g., associated with) a specific SR configuration (such as e.g., a specific SR resource.

In yet another example, the WTRU may transmit (e.g., trigger the transmission of) a wake-up request signal in case of availability of any of uplink control information (UCI) and data to transmit (e.g., the WTRU may trigger a wake up request in a case where a new UCI is to be transmitted, for example, depending on any of: (i) the UCI type (e.g., any of HARQ ACK, CSI, and precoding matrix indicator (PMI)), (ii) the priority associated with the UCI, and (iii) any of the LCH and the DRB associated with the UCI).

In yet another example, the WTRU may transmit (e.g., trigger the transmission of) a wake-up request signal in case of a detection of a beam failure and/or a radio link monitoring (RLM) event.

In yet another example, the WTRU may transmit (e.g., trigger the transmission of) a wake-up request signal in a case where channel conditions are measured with a quality satisfying or failing to satisfy a condition (e.g., being above or less than a (e.g., configured) threshold). Channel conditions may include e.g., any conditions relating to the state of the radio/channel, which may be determined by the WTRU based on any of: (1) a WTRU measurement (e.g., any of (i) L1/SINR/RSRP, (ii) channel quality information/modulation and coding scheme (CQI/MCS), (iii) channel occupancy, (iv) received signal strength indicator (RSSI), (v) power headroom and/or exposure headroom), (2) L3/mobility-based measurements (e.g., RSRP and/or reference signal received quality (RSRQ)), (3) an RLM state, and (4) channel availability in unlicensed spectrum (e.g., whether the channel is occupied based on determination of a listen before talk (LBT) procedure and/or whether the channel is deemed to have experienced a (e.g., consistent, durable) LBT failure)).

In yet another example, the WTRU may transmit (e.g., trigger the transmission of) a wake-up request signal in a case where an L3 or mobility event is triggered.

In yet another example, the WTRU may transmit (e.g., trigger the transmission of) a wake-up request signal in a case where a (e.g., consistent, durable) UL LBT failure is detected on the serving cell and/or active BWP.

In yet another example, the WTRU may transmit (e.g., trigger the transmission of) a wake-up request signal in a case where the WTRU autonomously switches of a BWP (e.g., upon expiry of a BWP switching timer and/or BWP switching due to initiation of RACH).

In yet another example, the WTRU may transmit (e.g., trigger the transmission of) a wake-up request signal in case of entering any of a (e.g., certain) discontinuous reception (DRX) state, cycle, and power saving mode, e.g., including short and/or long connected mode DRX.

In yet another example, the WTRU may transmit (e.g., trigger the transmission of) a wake-up request signal in a case where any of a tracking area update and a RAN paging area update is triggered (e.g., upon mobility to cell that may not have the WTRU context, out of a serving RAN paging area).

Examples of Procedures for Transitioning Between
Availability States and Wake-Up Request
Retransmissions In some embodiments, a WTRU may start a timer (e.g., a "prohibit" timer) upon transmitting a wake-up request after transitioning into an availability state. For example, the WTRU may transition to the availability state associated with the wake-up request upon (e.g., after) transmitting the wake-up request. In another example, the WTRU may transition to the availability state associated with the wake-up request (e.g., only) after receiving a response from the gNB, which may be any of a PDCCH transmission, a PDSCH transmission, and a reception of any of a control signal and a control element. The WTRU may stop the timer in a case where any of the availability state indication and a response to the wake-up request is received from the gNB. The WTRU may stop the timer upon (e.g., after) reception of a downlink signal from the gNB.

In some embodiments, the WTRU may transition to the default configured availability state after the expiry of the "prohibit" timer, or to the state that was active prior to transmitting the wake-up request. The WTRU may change its (e.g., RRC) state (e.g., to any of inactive and idle mode) after expiry of the "prohibit" timer. For example, the WTRU may transmit another (or a second) wake-up request- or retransmit it-after expiry of the timer, e.g., with modified transmission parameters including, any of the transmit power, the timing advance, and a spatial filter. For example, the WTRU may set the value of the "prohibit" timer as random backoff, whereby the random value may be selected between zero and the (e.g., configured max) timer value. The WTRU may retransmit the wake-up request on the supplemental uplink (SUL) after expiry of the "prohibit" timer and/or after a configured number of attempts. For example, the WTRU may transmit a wake-up request associated with any of a different availability state, a different transmission/reception point (TRP), and a different carrier, after any of: (i) not receiving a response from the network to the wake-up request, (ii) expiry of the "prohibit" timer and (iii) transmitting a configured number of wake-up request trials.

For example, the WTRU may be configured with (e.g., receive configuration information indicating) a (e.g., maximum) number of allowed wake-up request transmissions. For example, the WTRU may maintain a counter, which the WTRU may increment (e.g., by 1) after the transmission of a wake-up request. For example, the WTRU may transmit multiple wake-up request signals, up to the value configured for the (e.g., maximum) number of allowed wake-up request transmissions. For example, the WTRU may reset the counter upon receiving a response from the gNB to the wake-up request. In a case where the (e.g., maximum) number of allowed wake-up request transmissions is reached, the WTRU may any of: (i) transition to the default configured availability state for the cell, (ii) transmit a wake-up request signal on a different serving cell and/or TRP, and (iii) change its (e.g., RRC) state.

Example of Resource Monitoring and Selection Per Availability State

For example, the WTRU may activate or deactivate beam failure detection and/or RLM according to the active availability state. The WTRU may be configured with (e.g., may receive configuration information indicating) whether RLM and/or bidirectional forwarding detection (BFD) is to be used per availability state. After switching to an availability state, the WTRU may monitor for BFD and/or RLM signals in a case where they are configured for (e.g., associated with) the availability state.

For example, the WTRU may be configured with (e.g., may receive configuration information indicating) different beam failure detection and/or RLM resources to monitor per availability state. For example, BFD and/or RLM resources may be associated with one or more availability states. The WTRU may use different values for any of a BFD timer and a BFD threshold depending on the active availability state. The WTRU may apply different values for any of the RLM timers and counting thresholds depending on the active network availability state. The WTRU may suspend BFD and/or RLM in a case where the network (and/or the WTRU) is in the "Off" or "Deep sleep" availability state.

In some embodiments, the WTRU may be configured or predefined to initiate a cell reselection or SI acquisition procedure after switching into an availability state. For example, the WTRU may further perform any of a cell search, an initial access, and a mobility procedure. For example, the WTRU may be configured (e.g., receive configuration information indicating) per availability state with whether the WTRU may perform cell reselection. For example, the WTRU may be configured with (e.g., receive configuration information indicating) an alternate serving cell that may be used by the WTRU in an availability state in a case where the WTRU determines that the serving cell may have transitioned into this availability state. For example, the WTRU may initiate a random-access procedure to connect to the alternate serving cell.

In some embodiments, the WTRU may activate or de-activate one or more carriers and/or bandwidth part (BWP) on the serving cell according to the active availability state. For example, the WTRU may be configured (e.g., receive configuration information indicating) per availability state with a subset of carriers and/or BWPs that the WTRU may deactivate in a case where the WTRU determines to transition into this availability state. For example, the WTRU may re-activate those carriers and/or BWPs in a case where the WTRU determines to transition from the availability state into a different one. The same can be configured on an active carrier basis. For example, the WTRU may monitor an availability signal for an availability state per active component carrier and/or BWPs.

In some embodiments, a subset of uplink resources (e.g., any of RACH, PUSCH, and PUCCH) of the serving cell may not be used by the WTRU in a case where the WTRU does not receive an availability signal preceding the uplink resource. For example, all uplink resources may not be available for transmission by the WTRU until the next availability signal occasion in a case where an availability signal is not detected. For example, the WTRU may start a timer based on not detecting an availability signal in an availability signal occasion, and the WTRU may not use any uplink resources while such timer is running (e.g., during a time period corresponding to the timer). For example, the WTRU may transition in a C-DRX state (e.g., short or long DRX) based on not detecting an availability signal.

For example, the WTRU may be configured with a resource configuration that (e.g., may receive configuration information indicating that a resource) may be used per active availability state, including e.g., any of uplink resources, measurement resources, downlink data resources and control resources. The WTRU may, for example, activate or deactivate preconfigured resources (e.g., any of RACH, PDCCH, PUCCH, PUSCH, CG, and DL semi-persistent scheduling (SPS) resources) according to the active availability state. The WTRU may, for example, not use (for uplink) or not monitor (for downlink) resources that may be deactivated based on transitioning to an availability state that may not be associated with them.

In some embodiments, the WTRU may be configured to transmit the wake-up request signal on any of the normal uplink (NUL) and the supplemental uplink (SUL). For example, the WTRU may transmit the wake-up request signal on the SUL in a case where a channel measurement (e.g., RSRP) fails to satisfy a condition (e.g., is less than a (e.g., configured) threshold). The WTRU may transmit the wake-up request signal on the SUL, for example, in a subset of availability states. For example, the WTRU may transmit the wake-up signal on the SUL in a case where the WTRU doesn't detect the availability indication signal. For example, UL resources on the SUL may be active (e.g., only) in a subset of (e.g., configured) availability states.

In some embodiments, for a DRB configured with any of carrier aggregation (CA) and DC-duplication, the WTRU may (e.g., autonomously) deactivate duplication in a case where at least one of the legs associated with the duplicated DRB changes of availability state (e.g., is turned off or sleep mode). For example, the WTRU may apply duplication (e.g., only) in a subset of availability states, which may be configured by RRC (e.g., by receiving configuration information). For example, the WTRU may perform DC-duplication in a case where the master node (MN) and the secondary node (SN) are in the same availability state (e.g., "On").

In some embodiments, for a split bearer, the WTRU may transmit data to (e.g., both) gNBs (e.g., only) in a subset of availability states, which may be configured by RRC (e.g., by receiving configuration information). For example, the WTRU may perform regular packet data convergence protocol (PDCP) split bearer operation (e.g., only) in a case where the MN and SN are in the same availability state (e.g., "On").

Example of Wake-up Request in RRC Inactive and Idle

In some embodiments, the WTRU may be configured to (e.g., autonomously) switch to an (e.g., RRC) state (such as e.g., any of (e.g., RRC) idle and inactive) in a case where an availability state is active or no longer active. For example, the WTRU may switch to any of an (e.g., RRC) inactive and idle state based on determining that the availability state is "Off".

For example, the WTRU may be configured with (e.g., receive configuration information indicating) a subset of physical random-access channel (PRACH) and/or PUCCH resources (e.g., RACH occasions) that may be used while the WTRU may be in an availability state (e.g., any of off and deep sleep). The WTRU may not use other RACH occasions in a case where the applicable availability state is active.

In some embodiments, the WTRU may receive (e.g., consider) a preamble transmission as the wake-up request signal in a case where the WTRU is in a (e.g., RRC) state (such as e.g., any of (e.g., RRC) idle and inactive states). For example, the WTRU may initiate a RA procedure based on transmitting (e.g., triggering) a wake-up request (e.g., in a case where the conditions for transmitting a wake-up request are met). For example, the WTRU may initiate a new RA procedure upon data arrival while in the applicable availability state (e.g., "Off" or "deep sleep").

Figure 3:
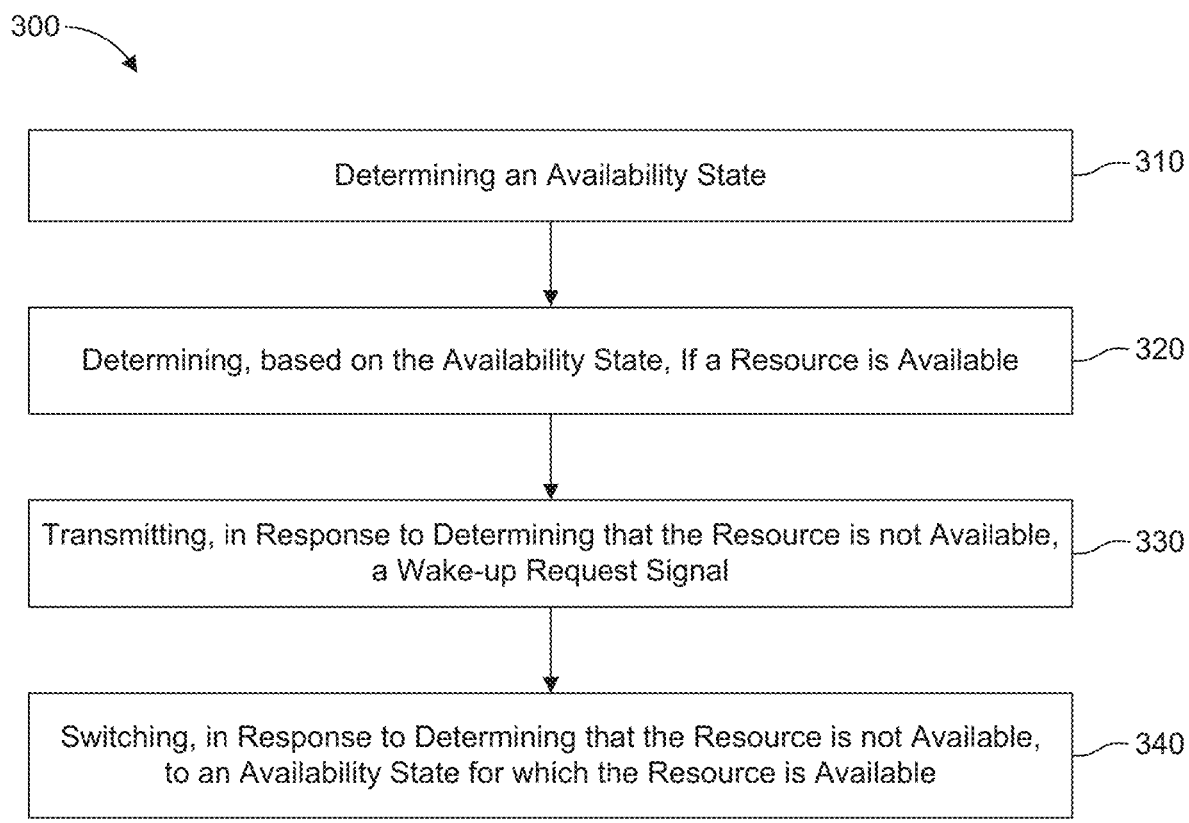
FIG. 3 is a diagram illustrating an example of a method for network energy savings.

FIG. 3 is a diagram illustrating an example of a method 300 for network energy savings. For example, the method may be implemented in a WTRU. At step 310, the WTRU may determine an availability state based on any of DCI, a MAC CE, and a signal. At step 320, the WTRU may determine, based on the availability state, if a resource may be available. At step 330, the WTRU may transmit, in response to determining that the resource may not be available, a wake-up request signal. At step 340, the WTRU may switch, in response to determining that the resource may not be available to an availability state for which the resource may be available.

For example, the WTRU may start a timer upon switching to the availability state for which the resource may be available.

For example, the WTRU may return, in response to expiration of the timer; to the availability state for which the resource may not be available and may transmit another wake-up request signal at a power higher than another power at which the wake-up request signal may have been previously transmitted.

For example, the WTRU may determine that the WTRU may have transmitted a maximum number of allowed wake-up request signals and may perform the following actions in response to determining that the WTRU may have transmitted a maximum number of allowed wake-up request signals: (i) the WTRU may transition to a default configured availability state for a current serving cell, (ii) the WTRU may transmit a wake-up request signal on a different serving cell, and (iii) the WTRU may change a radio resource control (RRC) state of the WTRU.

For example, the WTRU may receive an indication of the availability state for which the resource may be available, and the WTRU may stop the timer in response to receiving the indication.

For example, the WTRU may be configured with an association between a WTRU power savings state and the availability state for which the resource may be available. The method may further comprise switching, by the WTRU in response to determining that the resource may not be available to the WTRU power savings state associated with the availability state for which the resource may be available.

For example, the WTRU may be configured with different resources to monitor per availability state. The method may further comprise monitoring, by the WTRU in response to determining that the resource may not be available, resources associated with the availability state for which the resource may be available.

Figure 4:
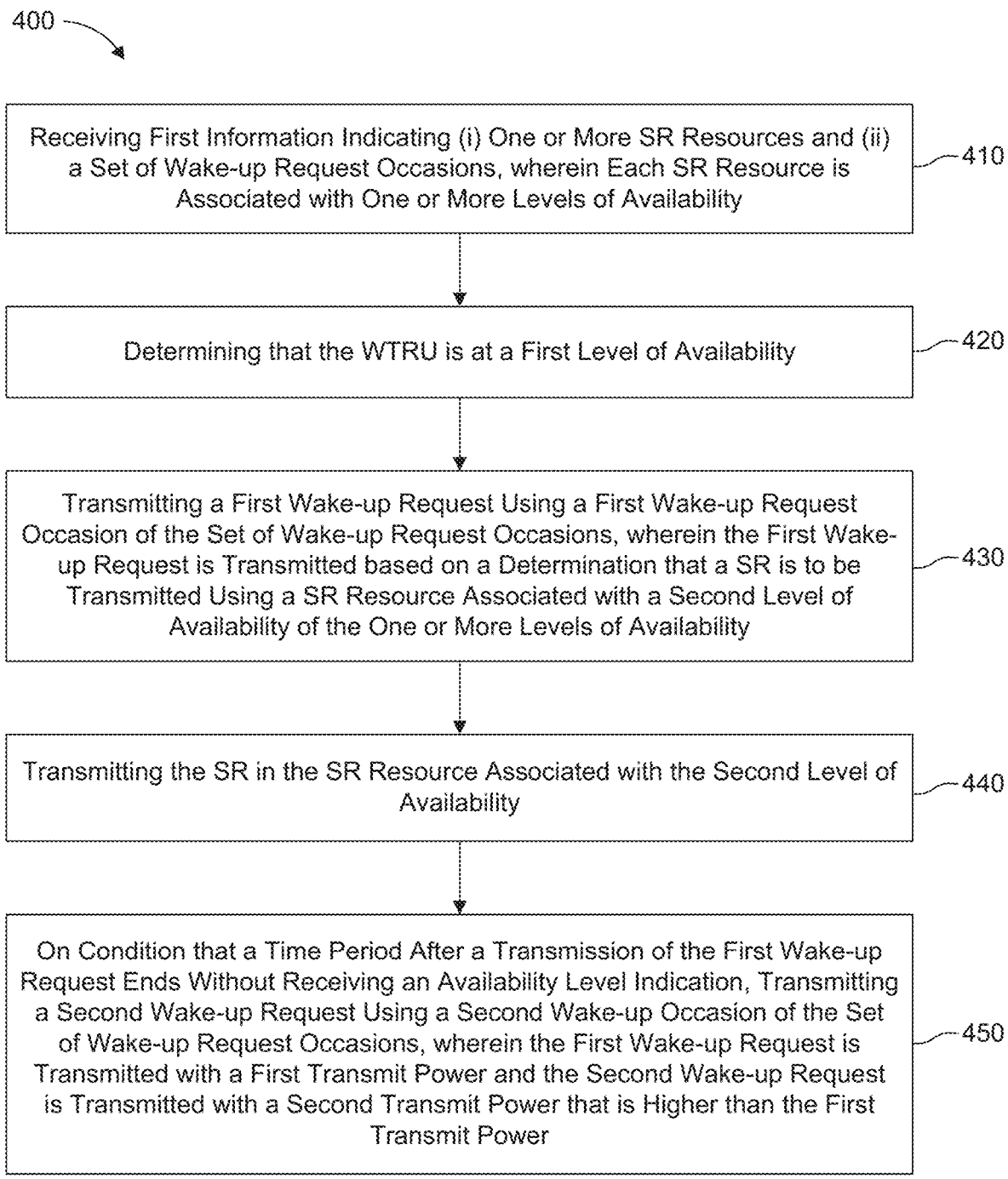
FIG. 4 is a diagram illustrating another example of a method for network energy savings.

FIG. 4 is a diagram illustrating another example of a method 400 for network energy savings. For example, the method 400 may be implemented in a WTRU. At step 410, the WTRU may receive first information indicating (i) one or more SR resources and (ii) a set of wake-up request occasions, wherein each SR resource is associated with one or more levels of availability. At step 420, the WTRU may determine that the WTRU may be at a first level of availability. At step 430, the WTRU may transmit a first wake-up request using a first wake-up request occasion of the set of wake-up request occasions, wherein the first wake-up request may be transmitted based on a determination that a SR may be to be transmitted using a SR resource associated with a second level of availability of the one or more levels of availability. At step 440, the WTRU may transmit the SR in the SR resource associated with the second level of availability. At step 450, on condition that a time period after a transmission of the first wake-up request ends without receiving an availability level indication, the WTRU may transmit a second wake-up request using a second wake-up occasion of the set of wake-up request occasions, wherein the first wake-up request may be transmitted with a first transmit power and the second wake-up request may be transmitted with a second transmit power that may be higher than the first transmit power.

For example, the first wake-up request occasion may be selected based on a determination that the first wake-up request occasion may be associated with the second level of availability.

For example, the WTRU may be determined at the first level of availability based on receiving a transmission indicating the first level of availability.

For example, the transmission may comprise DCI indicating the first level of availability.

For example, the transmission may comprise a MAC CE indicating the first level of availability.

For example, the first level of availability may be applicable after receiving the MAC CE indicating the first level of availability or after acknowledging the transmission carrying the MAC CE.

For example, transmission may comprise a signal generated from at least one sequence, wherein the first level of availability may be determined based on at least one property of the at least one sequence.

For example, the at least one property may comprise any of a parameter used for generating the at least one sequence, a time offset and a frequency offset.

For example, the transmission may comprise an RRC message indicating the first level of availability.

For example, the WTRU may be determined at the first level of availability upon a determination that an amount of time elapsed after determining that the WTRU may be at a third level of availability without receiving any transmission indicating any level of availability.

For example, the SR resource may be associated with a periodicity, wherein the SR resource may be associated with the second level of availability in a case where the periodicity satisfies a condition associated with the second level of availability.

For example, the condition associated with the second level of availability may be satisfied in a case where the periodicity associated with the SR resource is larger than or equal to a threshold associated with the second level of availability.

For example, the SR resource may be associated with a number of antenna ports, wherein the SR resource may be associated with the second level of availability in a case where the number of antenna ports satisfies a condition associated with the second level of availability.

For example, the condition associated with the second level of availability may be satisfied in a case where the number of antenna ports associated with the SR resource is smaller than or equal to a threshold associated with the second level of availability.

For example, the first information may further indicate the condition associated with the second level of availability.

For example, the first level of availability and the second level of availability may be respectively associated with a first power saving state and a second power saving state of the WTRU.

For example, the determination that a SR may be to be transmitted using the SR resource associated with the second level of availability may be based on any of a logical channel and a priority of the logical channel for which the SR may be to be transmitted.

For example, the method may further comprise determining a sequence for the first wake-up request and the second wake-up request within a set of sequences, wherein the sequence may be associated with any of (i) a coverage level, (ii) a geographical location, (iii) a measurement of a reference signal, (iv) a buffer status, (v) a traffic type, (vi) a logical channel or a priority of the logical channel for which the SR may be to be transmitted, (vii) a WTRU type, (viii) a requested bandwidth and (ix) beam information.

For example, the first information may further indicate parameters for initializing at least one sequence of the set of sequences.

For example, the method may further comprise initiating a cell reselection with an alternate serving cell that may be associated with the second level of availability.

For example, the first information may indicate the alternate serving cell to be used at the second level of availability.

Throughout embodiments described herein, (e.g., configuration) information may be described as received by a WTRU from the network, for example, through system information or via any kind of protocol message. Although not explicitly mentioned throughout embodiments described herein, the same (e.g., configuration) information may be pre-configured in the WTRU (e.g., via any kind of pre-configuration methods such as e.g., via factory settings), such that this (e.g., configuration) information may be used by the WTRU without being received from the network.

Any characteristic, variant or embodiment described for a method is compatible with an apparatus device comprising means for processing the disclosed method, with a device comprising circuitry, including any of a transmitter, a receiver, a processor, and a memory configured to process the disclosed method, with a computer program product comprising program code instructions and with a non-transitory computer-readable storage medium storing program instructions.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the various embodiments have been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The following reference may have been referred to hereinabove:

RP-212422 "Motivation for Network Energy Saving in Rel-18", Ericsson.

What is claimed is:

1. A wireless transmit/receive unit (WTRU) comprising circuitry, including any of a transmitter, a receiver, a processor, and a memory, wherein the circuitry is configured to:
receive, via radio resource control (RRC) signaling, information indicating a configured pattern of time periods, wherein each time period comprises an interval during which a cell is available for reception or transmission and an interval during which the cell is not available for reception or transmission;
receive configuration information indicating physical uplink control channel (PUCCH) resources for transmission of scheduling requests (SRs);
receive a downlink control information (DCI) comprising an indication associated with the configured pattern of time periods, wherein the indicated configured pattern of time periods is applicable after a pre-defined delay after the DCI is received;
determine whether the indication indicates that the configured pattern applies to reception;
determine that an SR is to be transmitted on one of the PUCCH resources configured for transmission of SRs; and
determine to not transmit the SR on condition that the PUCCH resource is not within an interval during which the cell is available for reception.

2. The WTRU of claim 1, wherein the indication associated with the configured pattern of time periods indicates to apply the configured pattern of time periods.

3. The WTRU of claim 1, wherein the indication associated with the configured pattern of time periods is received in a group common physical downlink control channel.

4. The WTRU of claim 1, wherein the circuitry is configured to transmit the SR on condition that the PUCCH resource is within the interval during which the cell is available for reception.

5. The WTRU of claim 1, wherein the configuration information further indicates physical uplink shared channel (PUSCH) resources for transmission of configured grants (CGs).

6. The WTRU of claim 5, wherein the circuitry is configured to:
determine that a CG is to be transmitted on one of the PUSCH resources configured for transmission of CGs; and
determine to not transmit the CG on condition that the PUSCH resource is not within the interval during which the cell is available for reception.

7. The WTRU of claim 1, wherein the configuration information further indicates channel state information (CSI) resources for transmission of CSI reports.

8. The WTRU of claim 7, wherein the circuitry is configured to:
determine that a CSI report is to be transmitted on one of the CSI resources configured for transmission of CSI reports; and
determine to not transmit the CSI report on condition that the CSI resource is not within the interval during which the cell is available for reception.

9. The WTRU of claim 1, wherein the PUCCH resources configured for transmission of SRs are associated with a periodicity.

10. The WTRU of claim 9, wherein the circuitry is configured to:
receive a medium access control (MAC) control element (MAC CE) signal indicating a threshold for the periodicity of the PUCCH resources;
determine that the periodicity of the PUCCH resources is greater than the indicated threshold; and
determine to transmit the SR based on the periodicity of the PUCCH resources being greater than the indicated threshold.

11. A method implemented in a wireless transmit/receive unit (WTRU), the method comprising:
receiving, via radio resource control (RRC) signaling, information indicating a configured pattern of time periods, wherein each time period comprises an interval during which a cell is available for reception or transmission and an interval during which the cell is not available for reception or transmission;
receiving configuration information indicating physical uplink control channel (PUCCH) resources for transmission of scheduling requests (SRs);
receiving a downlink control information (DCI) comprising an indication associated with the configured pattern of time periods, wherein the indicated configured pattern of time periods is applicable after a pre-defined delay after the DCI is received;
determining whether the indication indicates that the configured pattern applies to reception;
determining that an SR is to be transmitted on one of the PUCCH resources configured for transmission of SRs; and
determining to not transmit the SR on condition that the PUCCH resource is not within an interval during which the cell is available for reception.

12. The method of claim 11, wherein the indication associated with the configured pattern of time periods indicates to apply the configured pattern of time periods.

13. The method of claim 11, wherein the indication associated with the configured pattern of time periods is received in a group common physical downlink control channel.

14. The method of claim 11, further comprising transmitting the SR on condition that the PUCCH resource is within the interval during which the cell is available for reception.

15. The method of claim 11, wherein the configuration information further indicates physical uplink shared channel (PUSCH) resources for transmission of configured grants (CGs).

16. The method of claim 15, further comprising:
determine that a CG is to be transmitted on one of the PUSCH resources configured for transmission of CGs; and
determine to not transmit the CG on condition that the PUSCH resource is not within the interval during which the cell is available for reception.

17. The method of claim 11, wherein the configuration information further indicates channel state information (CSI) resources for transmission of CSI reports.

18. The method of claim 17, further comprising:
determining that a CSI report is to be transmitted on one of the CSI resources configured for transmission of CSI reports; and
determining to not transmit the CSI report on condition that the CSI resource is not within the interval during which the cell is available for reception.

19. The method of claim 11, wherein the PUCCH resources configured for transmission of SRs are associated with a periodicity.

20. The method of claim 19, further comprising:
receiving a medium access control (MAC) control element (MAC CE) signal indicating a threshold for the periodicity of the PUCCH resources;
determining that the periodicity of the PUCCH resources is greater than the indicated threshold; and
determining to transmit the SR based on the periodicity of the PUCCH resources being greater than the indicated threshold.

* * * * *